Figure 9:
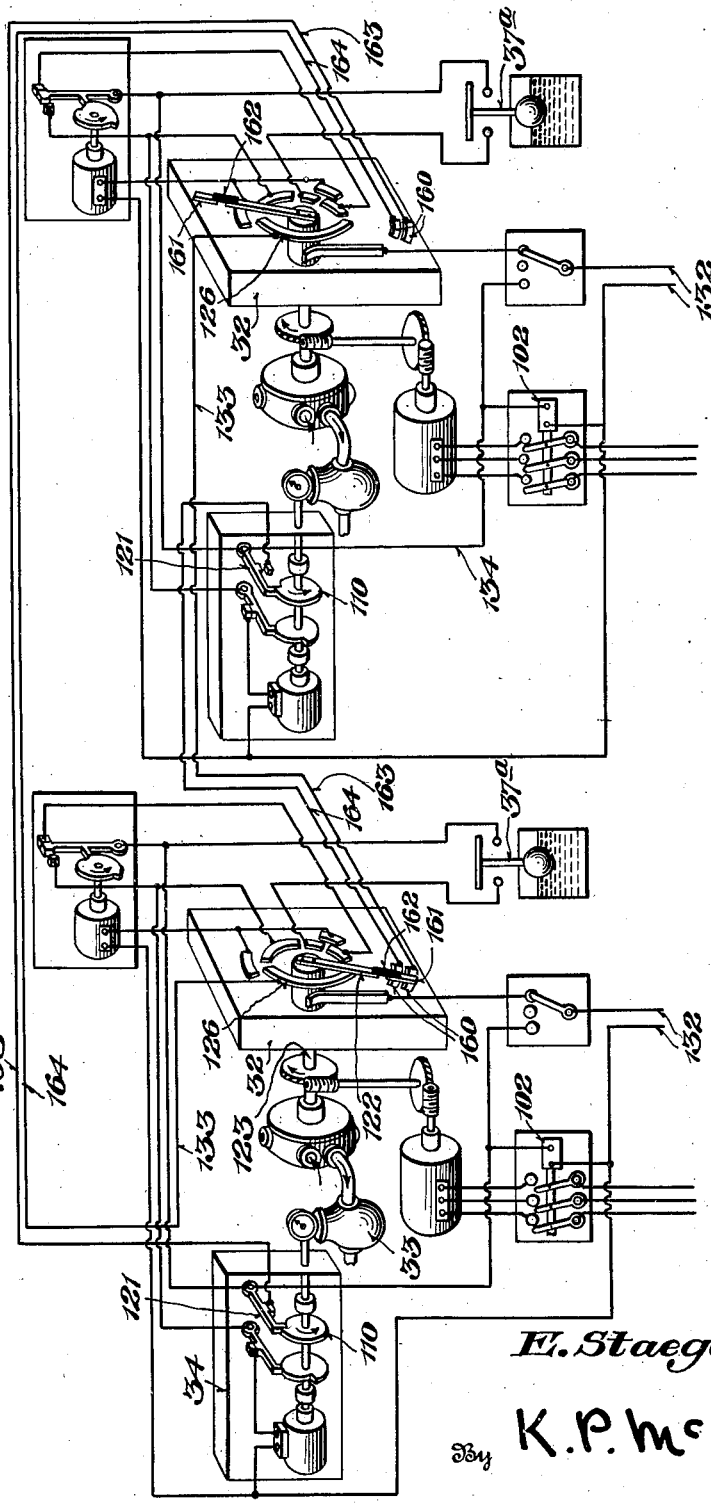

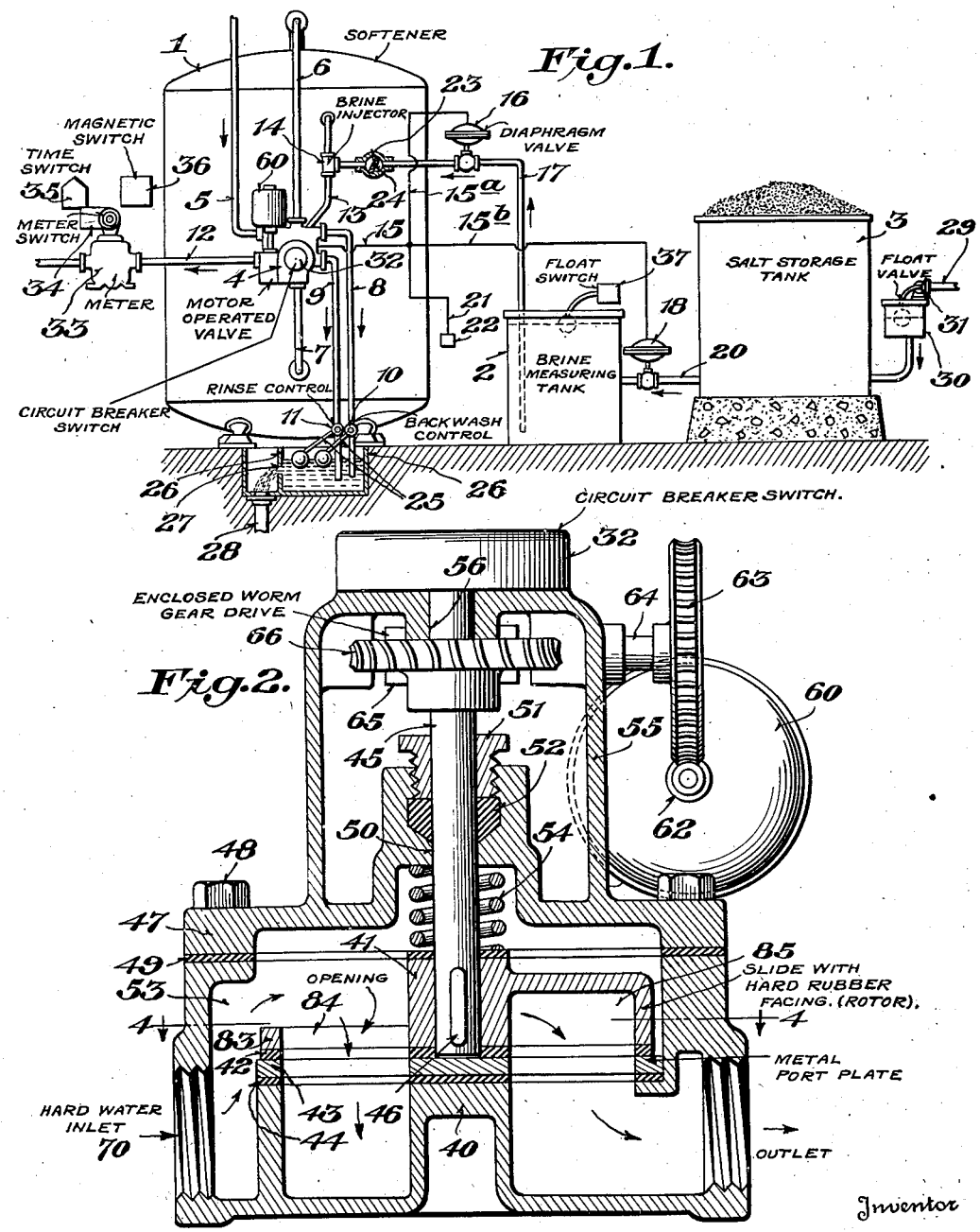

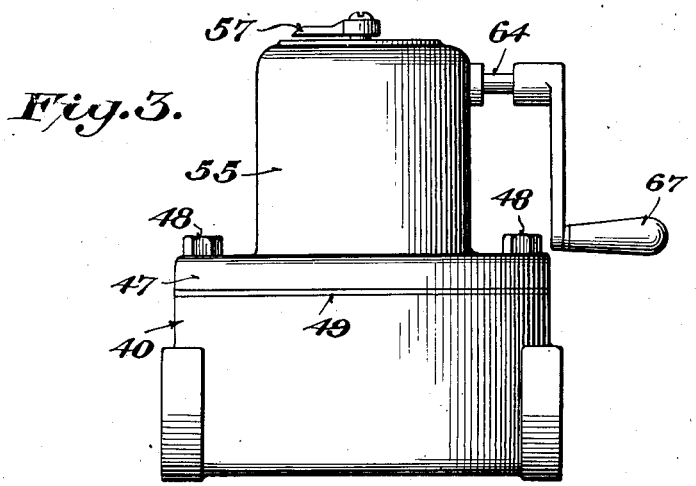
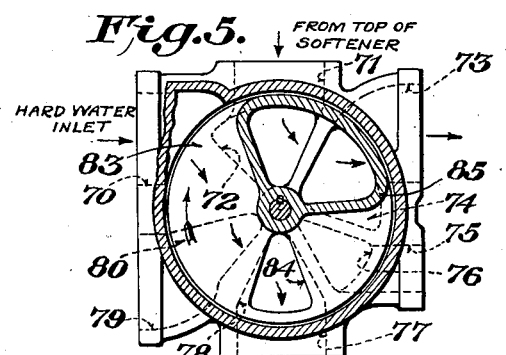
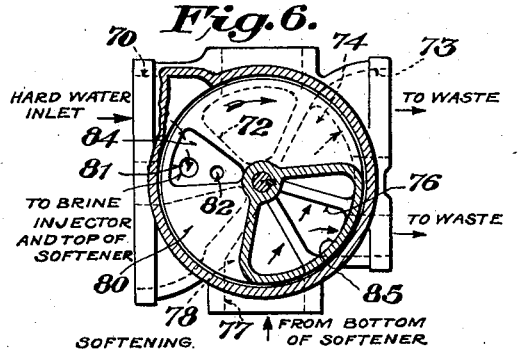
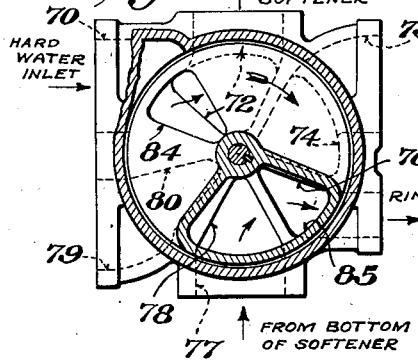
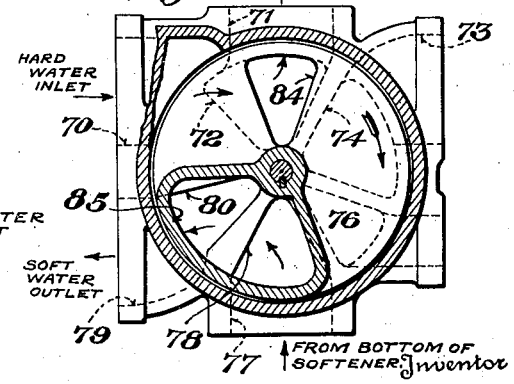

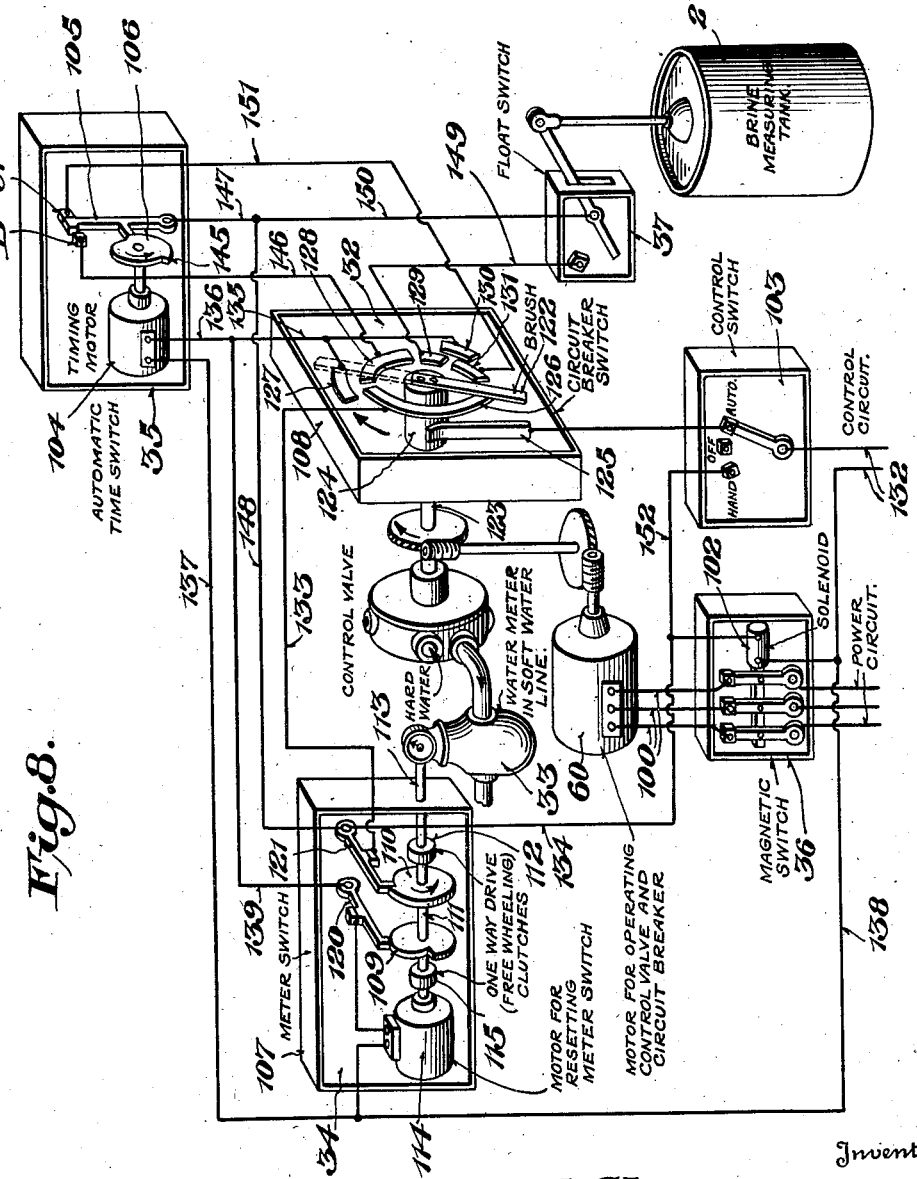

Aug. 18, 1936.　　E. STAEGEMANN　　2,051,155
WATER TREATING APPARATUS
Filed Jan. 27, 1934　　6 Sheets-Sheet 4

Inventor
E. Staegemann,
By K. P. McElroy
Attorney

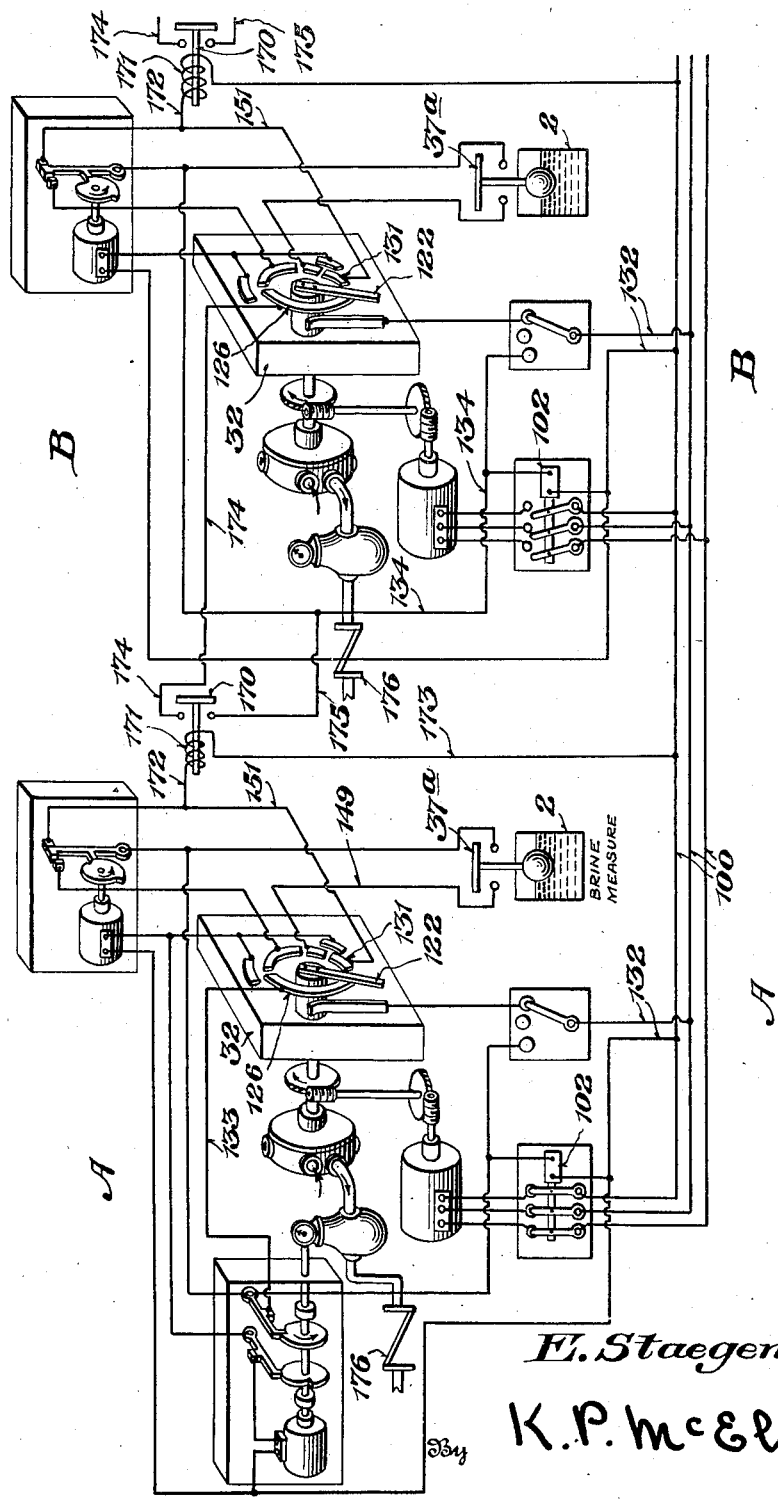

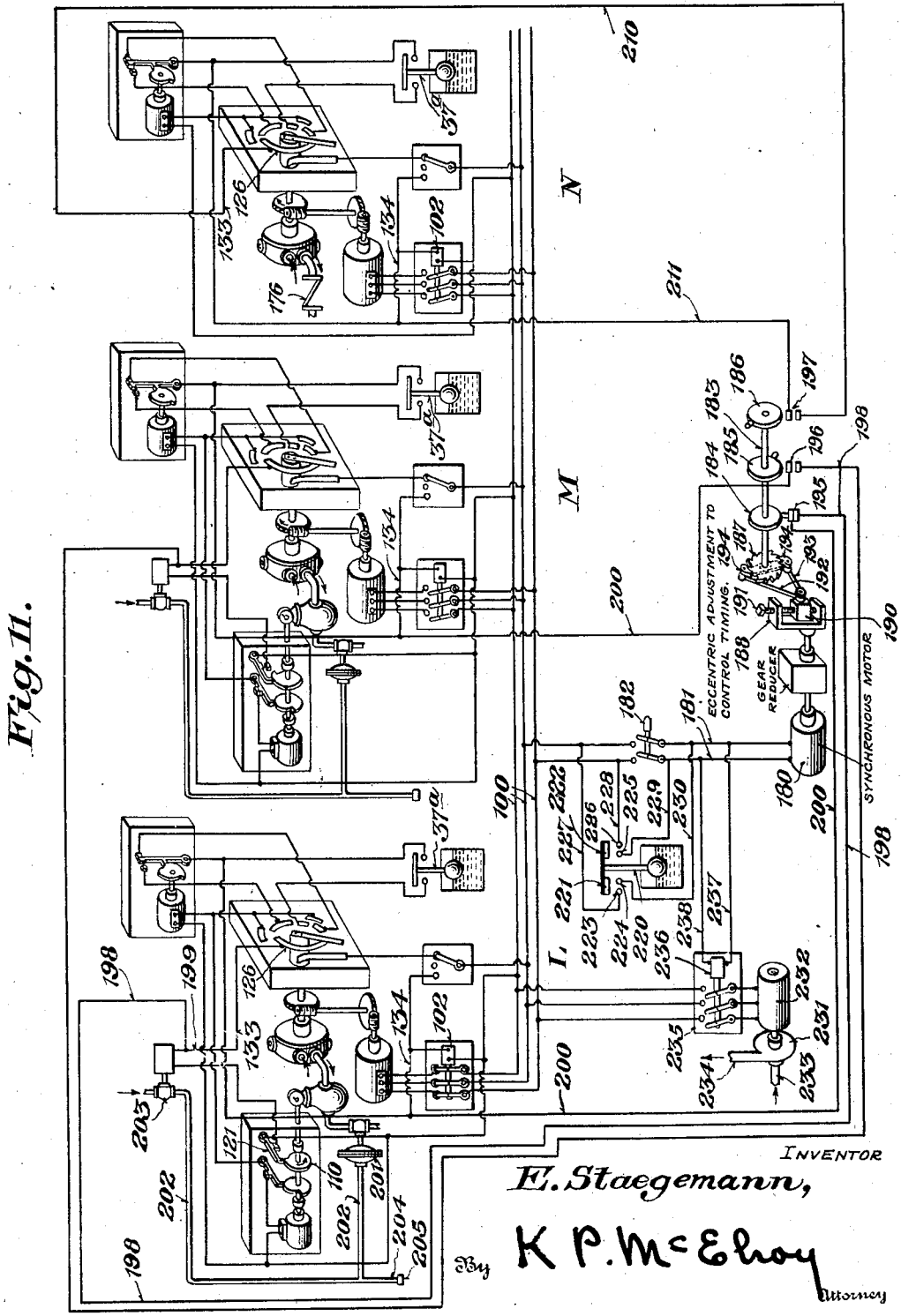

Patented Aug. 18, 1936

2,051,155

UNITED STATES PATENT OFFICE 2,051,155

WATER TREATING APPARATUS

Eugene Staegemann, Allendale, N. J., assignor to The Permutit Company (1934), Wilmington, Del., a corporation of Delaware Application January 27, 1934, Serial No. 708,653

16 Claims. (Cl. 210—24)

This invention relates to improvements in water treating apparatus; and it comprises an interlocked battery of water softening units, each unit comprising a container adapted to hold a bed of zeolites, a multiport valve adapted to control a regenerative cycle of successive phases of backwashing, brining, rinsing, and return to softening, a motor adapted to turn the valve through the regenerating cycle, switch means for the motor advantageously connected with a water meter in the soft water line adapted to start the motor in the regenerating cycle, associated control means for regulating the length of the different phases in the cycle, and interlocking switch means interconnecting a plurality of such units and adapted to so control the circuits in the several units that regeneration takes place in spaced sequence; each of said units advantageously comprising in combination with said container and said valve a source of brine, an injector controlled by said valve, communicating with said container and adapted to draw brine from said source through a conduit, a pressure operated valve in said conduit, said multiport valve having a connection to the brine injector and a connection to the pressure operated valve in the brine conduit whereby said multiport valve is adapted to control injection of brine into the softener, said valve having two connections to waste, flow controllers in the waste connections, one adapted to control the flow of backwashing and the other adapted to control the rinsing flow, and both waste connections being adapted to carry off waste liquid while brine is being injected; all as more fully hereinafter set forth and as claimed.

Large scale industrial and municipal water softening by base exchange presents problems which do not concern small scale or domestic softening. The principal requirements in large scale plants are that softening should be performed with the highest efficiency possible, that is, with the smallest amount of brine; that no hard water should get into the service line (this being particularly important in certain industries such as textile mills and dye-works); and that the necessity of attendance by operators should be cut down as far as possible. These requirements are best met by automatically operated softeners.

Automatic softeners may be built of smaller dimensions than the manually operated type for equal duty. Manually operated softeners are usually made large enough to run for relatively long periods between regenerations in order to save the operator's time by reducing the frequency of regeneration. The automatic may be smaller, regenerating more frequently, and yet produce the same daily soft water output as the larger manually operated softener, without the excessive attention which a smaller manual softener would require. Thus a saving in first cost as well as in operating cost is realized.

Certain railroad water stations and other isolated plants may not have a regular attendant, but only an operator making occasional visits. Large water treatment plants comprising a number of zeolite units, together with other equipment such as filters, etc., may be too much for one operator to handle efficiently. In many factories the water softener is in charge of one man assigned to a multiplicity of other duties. When he inspects the softener, he may find the softening run not yet complete but, to avoid overrunning, he may be tempted to regenerate prematurely. This wastes salt and water. On the other hand, the operator may not be on hand just when regeneration is required and the softener is allowed to overrun, thus permitting hard water to flow to service. Automatic softening eliminates these difficulties.

According to the present invention I provide an automatic softening apparatus comprising a plurality of units, each having automatic operating control, and the several control units being interlocked to bring about regeneration in an automatically spaced sequence. In my automatic system, some of the softeners are softening while exhausted units are being regenerated. Thus soft water is supplied by the battery of units without interruption. I also provide an improved brining control, preventing wastage of brine.

The new automatic system carries out all operations correctly and automatically. Regeneration in each unit takes place on time; never too soon or too late. Salt waste is avoided by mechanically measuring the correct quantity of salt brine. Backwashing and rinsing are controlled, thereby avoiding waste of water in these operations and maintaining the zeolite in a clean, active condition. Control valves are automatically turned slowly, preventing disturbance of the zeolite beds. A battery of units particularly adapted to large scale work and to automatic regeneration in spaced sequence is provided. The production of completely softened water at a minimum of operating expense is assured. The system is readily adaptable to municipal water softening and to either gravity or high pressure water flow.

In the accompanying drawings I have shown, more or less diagrammatically, water softening apparatus within my invention. In this showing, Fig. 1 is a diagrammatic view partly in elevation, partly in vertical section, of one water softening unit complete with brine supply, said unit being adapted to automatic operation and control, Fig. 2 is a view in section of the multiport valve of Fig. 1 with motor, Fig. 3 is a view in elevation of the valve of Fig. 2 adapted for manual operation, Fig. 4 is a section taken along the line 4—4 of Fig. 2, showing the valve in softening position, Fig. 5 is a similar view, showing the valve in backwashing position, Fig. 6 is a similar view, showing the valve in brining position, Fig. 7 is a similar view, showing the valve in rinsing position, Fig. 8 is a diagram showing the electrical controls for a single basic unit, Fig. 9 is a diagram showing two units, having interlocking electrical connections, Fig. 10 is a diagram showing three units of modified basic type having modified interlocking electrical connections, and Fig. 11 is a diagram showing three units of modified basic type having a central timing control.

Like reference characters indicate like parts throughout.

Referring to Fig. 1, the basic softener unit comprises a container 1 adapted to contain a charge of zeolites, a brine measuring tank 2 and a salt storage tank 3. Flows to and from the container are controlled by means of a multiport valve 4, having a connection 5 to a source of raw water, a connection 6 to the top of the container, a connection 7 to the bottom of the container, two connections 8 and 9 leading to backwash and rinse controls 10 ad 11 respectively, a connection 12 for softened water, and a connection 13 through a brine injector 14 to the container 1 above the top of the charge of zeolites (not shown). The valve also has a pilot line pressure connection 15 having a branch 15a leading to a diaphragm valve 16 in a brine connection 17 between the injector 14 and the brine measuring tank 2, and a branch 15b leading to a diaphragm valve 18 in connection 20 between the salt storage tank and the brine measuring tank. Another branch, 21, is connected into pilot line 15 as shown. This branch is fitted with a restricted outlet orifice 22 adapted to discharge to waste. Valve 16 is of a type normally closed and adapted to be opened when pressure is admitted to the diaphragm, the valve 18 is of a type normally open and adapted to be closed when pressure is admitted to the diaphragm.

In connection 17, between injector 14 and diaphragm valve 16 is a check valve 23 with a small orifice 24 in the valve member. This check valve prevents surges of water back into the brine measuring tank 2, but the orifice 24 normally allows water pressure to act on the valve member of valve 16, thereby aiding to keep valve 16 closed when no brine is being withdrawn through line 17.

The multiport valve, as shown, is adapted upon being rotated to a plurality of positions throughout a complete circle to make the proper connections for a regenerative cycle comprising backwashing, brining, rinsing and return to softening.

The rate of flow control for backwashing and rinsing each comprises a float valve 25, controlled by the water level in a weir box 26 having a weir 27 at a predetermined height as shown. The flow controls may be of the type described in the Applebaum Patent No. 1,443,892. These controls, which can be independently adjusted, regulate the rates of backwashing flow and of rinsing flow to a desired value, whatever may be the pressure on the backwashing and rinsing water entering the softener. Wash water flows from the weir box to a waste pipe 28, as shown. Ordinarily it is desirable to adjust the float valves so that a strong backwash flow, and a comparatively gentle rinsing flow, are provided. The additional advantages of providing two waste connections from the valve will be described later.

The brine supply comprises in addition to the brine measuring tank and salt storage tank, an inlet connection 29 in the salt storage tank, for water for making up brine, the flow of water being controlled by a chamber 30 and a float valve 31 maintaining a water level in chamber 30 corresponding to the level desired in the brine measuring tank 2. The arrangement is such as to prevent the brine measuring tank from overflowing, while automatically setting a desired level of brine therein. Flow of brine to the injector 14 is controlled by the diaphragm valves 16 and 18 in an operation which is described later.

The automatic control means indicated diagrammatically in Fig. 1 comprises a valve operating motor 60, a circuit breaker control switch 32, a water meter 33 in the soft water line, a meter switch 34 operated by the meter, a time switch 35, a magnetic switch 36 in a power line, and a float switch 37 on the brine measuring tank. No electrical connections are shown in this view.

*The valve*

The multiport valve is shown in detail in Figs. 2 to 7. As shown in Fig. 2, the valve comprises a ported stator 40 and a chambered rotor or slide 41. The rotor advantageously is provided with a hard rubber facing 42. A fixed port plate 43, advantageously of bronze or stainless metal, is placed between the facing 42 of rotor 41 and the stator 40, being fixed to the stator with an interposed gasket 44. The rotor is turned by a shaft 45, keyed to the rotor by a key 46.

A closure member 47 is attached to the valve stator 40 by bolts 48, a gasket 49 being interposed as shown. The closure has a bore 50 through which the rotor shaft 45 runs. A packing sleeve 51 and packing 52 provide a leak proof journal, so that the closure forms a pressure-tight cover for the stator, enclosing a chamber 53. A spring 54 positioned as shown between the closure and the rotor aids in holding the rotor tightly against the stator.

The closure is provided with an upwardly extending cylindrical portion 55 having a bore 56 in which the upper end of the valve shaft 45 is journaled. The end of the shaft extends above the closure and is connected to the circuit breaker switch 32.

The rotor shaft is arranged to be rotated by means of an electric motor 60 which may be mounted on the valve closure. The motor turns the shaft through worm 62, gear 63, shaft 64, worm 65, and gear 66 fixed to the valve shaft. As a result of the double gear reduction the valve rotor is turned quite slowly from one position to another. This prevents sudden turning on or off of liquid flows, which might disturb the zeolite bed in the softener.

Fig. 3 shows a valve adapted for manual rather than motor operation. In this showing the motor, worm 62 and gear 63 are omitted, and a handle 67 is mounted on shaft 64. In place of the circuit breaker switch 32 of Fig. 2, an indicating pointer 57 is provided on the end of shaft 45 to indicate the valve position.

As shown in Figs. 2 and 4 to 7, the valve stator has a hard water inlet connection 70 connected with pipe 5 and in direct communication with the chamber 53 surrounding the rotor. Thus the pressure in the hard water line aids the spring 54 in forcing the rotor against the stator so as to prevent leakage at the moving surfaces. The stator also has an outlet 71 connected with pipe 6 leading to the top of the softener and in communication with a port 72 in the stator face; a backwash water outlet 73 connected with pipe 8 and communicating with a port 74 in the stator face; a rinse water outlet 75 connected with pipe 9 and in communication with a port 76 in the stator; an opening 77 connected through pipe 7 with the bottom of the softener and communicating with a port 78 in the stator face; and a soft water outlet 79 connected with pipe 12 and in communication with a port 80 in the stator face. In addition, the stator face has a port 81 connected with the brine injector 14 through connection 13 and a port 82 (see Fig. 6) connected through lines 15, 15a and 15b with the diaphragm valves 16 and 18.

The valve rotor comprises a discoid portion 83 having an opening 84, and an arcuate, covered, open-bottomed chamber 85.

The several operating positions of the valve are shown in Figs. 4 to 7. In the softening position, shown in Fig. 4, hard water flows from the inlet connection 70 into the chamber 53 and over the discoid portion 83 of the rotor, through opening 84, port 72 and outlet 71 and thence to the top of the softener. Softened water flows from the bottom of the softener through opening 77, stator port 78, rotor chamber 85, stator port 80, and outlet 79, to the water meter and thence to service.

In the backwash position, shown in Fig. 5, hard water for washing flows from chamber 53 through rotor opening 84 and stator port 78 to the bottom of the softener; and waste wash water flows from the top of the softener through stator port 72, rotor chamber 85 and stator port 74 and through connection 8 to the backwash flow controller 10 and waste.

In the brining position, shown in Fig. 6, hard water passing through rotor opening 84 enters port 81 connected through line 13 with the brine injector and the top of the softener, and also through port 82, connected through pilot line 15 with the diaphragm valves 16 and 18. The small orifice 22 at the end of branch 21 being much smaller than the area of port 82 and pilot line 15, water pressure is maintained in the pilot connections and diaphragm valve 16 in the brine connection 17 is opened, permitting the injector to suck brine from the measuring tank and inject it into the softener. At the same time, diaphragm valve 18 in connection 20 is closed, whereby the brine measuring tank is prevented from filling up during the time brine is being injected into the softener. As soon as the rotor 41 is moved to the next or rinsing position (Fig. 7) the port 82 is disconnected from the water supply and the pressure in the pilot line 15 is released through orifice 22, permitting the diaphragm valves 16 and 18 to return to their normal positions. If desired, a simple constriction or small orifice may be substituted for the diaphragm valve in connection 20, in which case the filling up of the brine measuring tank 2 takes place slowly relative to the rate of brine injection and the tank 2 is not substantially replenished during the time of the brining operation. In this modification branch connection 15b is omitted. The arrangement of the separate brine injector 14 connected through the valve ports with the hard water supply line is highly advantageous in providing automatic control of the brining operation; such control being simple and direct and the injector being readily accessible at all times. The separate brine line running directly to the softener from a brine measuring tank permits of accurate control of the salt consumption and prevents leakage of brine into the service line.

In the brining position of the valve, first water and then spent brine flows from the bottom of the softener through connection 7, stator port 78, rotor chamber 85, and stator ports 74 and 76, through both connections 8 and 9 and to waste through both flow controllers 10 and 11. The advantage of having the spent brine exhaust through both waste connections at once is that this provides for minimum resistance to the flow of spent brine from the softener, so that the injector works against practically zero discharge pressure. This insures efficient and positive injection of brine.

In the rinsing position of the valve, shown in Fig. 7, hard water flows to the top of the softener as in the case of the softening operation, and waste rinse water flows from the bottom of the softener through opening 77, port 78, rotor chamber 85, port 76, connection 9 and flow controller 11 to waste. It will be noted that the port 72 communicating with the top of the softener is but partly open in the rinsing position, but this small opening is sufficient since the controller 11 throttles the flow, assuring a gentle rinsing which will move the brine slowly through the zeolite, thereby providing prolonged contact between zeolite and brine. This results in efficient brine utilization.

It should be noted that all port openings and passages within the valve have a cross section at least equal to the area of the connecting piping, to avoid undue throttling.

This multiport valve may be used to control operation of a water filter. So doing, the brine storage and control connections can be omitted and only three of the four valve positions used, viz. filtering (softening) backwashing, and filtering to waste (rinsing).

In this valve, the entire cycle of operations is carried out by turning the valve disc stepwise through one full revolution. Manual operation, if desired, is so simplified that even an operator unfamiliar with the working of the softener and with the principles involved, can operate the softener manually without danger of any mistake. An indicator shows at all times the position of the disc.

If it is desired for any reason to bypass the softener and to supply hard water to the point of use, the valve disc may be turned to a "bypass" position, which lies about half way between brining and backwashing positions, and in which hard water is passed by the rotor opening 84 from chamber 53 through port 80 and directly to the service line. In this position the ports leading to the top and bottom of the softener are closed and the softener tank is entirely disconnected from the supply and service pipes.

*The electrical controls*

The electrical control and operating system for a basic unit is diagrammed in Fig. 8. In the present invention the electrical circuit for operating the main motor which turns the valve is separate from the control circuit which includes the devices controlling the timing of the valve operation. The valve motor circuit as shown comprises the three wires 100 of a three phase alternating current line. If desired, the valve motor may be run on any other source of current desired, e. g. 1 or 2-phase A. C., or D. C., of any desired voltage. The valve motor circuit is made or broken by a magnetic switch 36 operated by a solenoid or electromagnet 102.

The control circuit includes the solenoid 102, a three-position control switch 103, the time switch 35 comprising a timing motor 104, a two-way switch 105 operable by a cam 106 on the timing motor, the float switch 37 in operative connection with the brine measuring tank, a meter switch designated as a whole by 34, and a circuit breaker designated as a whole by 32.

The meter switch comprises cam elements 109 and 110 mounted on a shaft 111 which is rotatable in one direction by the water meter through a one-way (slipping) clutch 112 and a shaft 113. The shaft 111 and cams 109 and 110 are also adapted to be rotated in the same direction by a resetting motor 114 through a one-way clutch 115. The arrangement is such that when the meter drives the cams through clutch 112, clutch 115 slips, and when the resetting motor drives the cams through clutch 115, clutch 112 slips. The meter switch further comprises cam operated switches 120 and 121 as shown.

The circuit breaker 32 comprises a rotatable contact-making or brush element 122 adapted to be driven by the valve operating motor 60 through an extension 123 on the valve shaft and a hub 124, as shown. Electrical connection is made to the hub and the brush by means of a spring contact 125. Separate, arcuate contact segments 126, 127, 128, 129, 130 and 131 are mounted concentrically around the hub and are adapted to be contacted by brush 122 during its rotation. The length of arc and the angular position of these contact segments are determined by the character of the rotary multiport valve used. Other types of valve than that shown can be used; for instance the types making connections for the several regenerating operations at a plurality of equal angular positions. In this case, a different arrangement of arcuate contact segments can be provided.

The timing motor 104 is advantageously of the synchronous alternating current type, which requires that the control circuit be alternating current, usually of 110 or 220 volts. Other types of timing motors can, of course, be used; for instance constant speed direct current motors or governor controlled motors of various sorts; but it is usually convenient to use a synchronous motor and alternating current. In cases where simple 110 or 220 bolt alternating current is not available, a small converter may be provided to supply alternating current to the control circuit.

Describing now the functioning of the operating and control system, Fig. 8 shows the position of the various elements just at the beginning of the regenerative cycle and just at the end of the softening operation. Rotation of cam 110 by the water meter 33 has just caused the end of switch 121 to pass the cam notch, closing the switch. The brush 122 is in the position shown, at the end of arcuate member 126, and, the control switch 103 being set in the "automatic" position as shown, current will flow through one of the inlet wires 132 of the control circuit, through the control switch 103, spring contact 125, brush 122, arcuate member 126, wire 133, switch 121, wire 134, the solenoid 102, and the other wire 132. All other parts of the control circuit are dead at this time. The closing of the solenoid circuit effected by the meter switch as described closes the magnetic switch 36 and the valve motor 60 is energized and starts the valve shaft, and the circuit breaker, to rotating slowly. Brush 122 moves over segment 126, and finally reaches segment 128, which is positioned at an angular position corresponding to the valve position for backwashing as shown in Fig. 5. The brush also contacts segment 127 at this point. As the brush slips from the end of member 126, the solenoid circuit is broken, allowing the magnetic switch to open. The motor stops, leaving the valve in backwashing position for the duration of the backwashing stage. The brush position at this time is indicated in dotted lines in Fig. 8.

The system is now set for the backwashing operation, which goes on for a predetermined length of time. The duration of backwashing is controlled by the timing motor 104. The brush 122 contacting segment 127 closes the timing motor circuit through wires 135, 136, 137, 138 and 132 and starts the timing motor. At the same time, a circuit is established through resetting motor 114, switch 120 and wire 139, switch 120 being in closed position and the resetting motor being in parallel connection with the timing motor.

All circuits other than those energizing the timing motor and the resetting motor are dead during the backwashing phase.

The resetting motor now turns, opening switch 121, and continuing to rotate until the end of switch 120 drops in the notch of cam 109, stopping the resetting motor. This operation resets the cams in proper position so that when the softening operation is resumed, the meter, turning the cams, will function to start the regenerating cycle upon passage of the predetermined quantity of softened water through the meter. During each complete cycle of softening and regenerating operations, the meter switch cams make one complete revolution. By changing the relative angular positions of the notches of the cams with respect to each other, the meter can be made to initiate the regeneration cycle after different quantities of water have passed through the meter. This enables the meter control to be adjusted to the hardness of the water.

While the resetting motor 114 is performing its functions, the timing motor is also running. As shown, the timing motor cam 106 has a raised portion 145, which normally holds the switch arm 105 in contact with point A. After a length of time equal to that desired for the backwashing to continue, the rotation of cam 106 causes the switch arm 105 to drop from the raised portion, breaking contact at A and making it at B. The length of the raised portion associated with the speed of the timing motor determines the length of the backwashing operation.

When contact is made at B, the backwashing operation ends, and the system functions to turn the valve to brining position; a circuit being established through brush 122, segment 128, wire 146, contact B, wires 147, 148 and 134, and the solenoid 102. The magnetic switch is thus closed, and the valve motor rotates the valve. All other circuits are dead during this turning step.

Brush 122, leaving segment 127, moves over segment 128 and finally slips off 128, breaking the solenoid circuit and thus stopping the motor, and moves on to segment 129. Segment 129 is at an angular position corresponding to the proper valve position for brining.

The brining operation now takes place. No circuit is alive during this operation.

The length of the brining operation is determined by the amount of brine injected into the softener from the brine measuring tank. When the liquid in this tank drops below a predetermined level, float switch 37 closes. This establishes a circuit through brush 122, contact segment 129, wire 149, switch 37, wires 150, 148, 134 and the solenoid 102; thereby closing the magnetic switch and starting the valve motor to rotating the valve from brining to rinsing positions.

The brush 122 shortly contacts with segment members 130 and 131. When the brush slips off the end of member 129, the solenoid circuit is broken, the magnetic switch is opened, and the valve motor stops, leaving the valve in proper position for rinsing. Brush 122 is left in contact with segments 130 and 131.

The timing of the rinsing phase is controlled by the timing motor 104. A circuit is established through brush 122, segment 130, wires 135 and 136, the timing motor and wires 137 and 138. All other circuits are dead in this phase. The timing motor then starts and turns cam 106 until switch arm 105, which has been resting on the depressed portion of the cam, is moved by the raised portion back to make contact with point A and to break contact with point B.

Closing of contact A terminates the rinsing operation. A circuit is now established through brush 122, segment 131, wire 151, contact A, wires 147, 148, 134 and the solenoid. The magnetic switch is closed, and the valve motor starts turning the valve and hence brush 122. All other circuits are dead during this operation.

Brush 122, leaving segment 130, moves over member 131 and slips off this member, whereupon the solenoid circuit is broken and the valve motor stops, leaving the brush at the beginning of member 126, and the valve in softening position.

A complete regenerating cycle has been performed. Softening takes place until the water meter again causes the meter switch to close the circuit starting the regenerating cycle.

The control system may be thrown out of action, if desired, and the movement of the valve from one position to another performed at will, by moving the control switch to "hand" position. This closes a circuit through wire 152 and the solenoid, closing the magnetic switch and energizing the valve motor. When the valve has been turned by the motor to the desired position, as shown by the position of brush 122, the control switch is turned manually to "off" position and the motor stops.

Advantageously, those ends of contact segments 126, 128, 129 and 131 from which the brush 122 slips onto the next segment, are slightly raised from the plane in which brush 122 moves and the brush is made of a spring material. In this arrangement the brush snaps from the raised ends of the segments and the circuits are broken quickly without sparking and burning of the contact points.

When combining segments 128 and 129 into a single segment and omitting the brine float switch 37, the control is suitable for reconditioning water filters.

Both the timing motor 104 and the resetting motor 114 are preferably provided with speed reducers (which may be built integral with the motor casings) so that the cam 106 and shaft 111 are rotated at a slow rate of speed.

It is a feature of this automatic control system that all variables are adjusted independently of each other. The number of gallons of water passing through the meter in the softening run may be varied by adjusting the relative angular positions of cams 109 and 110 on shaft 111. The duration of backwashing as well as of rinsing may be varied by adjustment of the automatic time switch. The amount of brine withdrawn may be adjusted in the float switch. As previously explained, the rates of flow of backwashing and rinsing are likewise controlled and are adjustable. Thus all these variables can be adjusted so that the most efficient and economical operation of the softener results. After the adjustments have once been made, the automatic control mechanism will faithfully carry through each cycle as an exact duplicate of the first one.

*Interlocking units*

In Fig. 9 I have shown a combination of two basic units so interlocked as to prevent either unit from going into the regenerating operation while the other unit is regenerating (even if the water meter switch sets the controls for initiating regeneration). Thus both softeners can never be out of action at the same time, though both can be softening at the same time. As shown, the interlocking system comprises in each unit an interlock switch operable by the circuit breaker brush 122 and comprising two short arcuate contact segments 160 and a contactor 161 adapted, in one position, to make connection between the two contact segments. The contactor is attached to the end of the brush 122, and insulated therefrom, by means of a piece of insulating material 162. The contact segments are positioned in an angular position corresponding to the normal or softening position of the softener. If desired, the contacting members and the contactor can be arranged to be operated otherwise than by the brush; for example the contactor may be mounted elsewhere, as on the valve shaft 45 or on extension 123, and the contact segments arranged accordingly.

The interlock switch for each softening unit is connected by wires 163 and 164 into the wire 133 of the other unit leading from the meter switch 121 to the circuit breaker segment 126. Normally the closing of switch 121, upon the water meter moving cam 110 to a predetermined position, is adapted to initiate regeneration. With the interlocking arrangement shown, however, the circuit through 132, 102, 134, 121, 133 and 126 of one softener can only be completed when the contactor 161 of the other softener covers contact segments 160; that is, when the other softener is in the softening position. If the other softener is in any of the positions of the regenerating cycle, the interlock switch will be open, and regeneration in the first softener can not proceed until the other softener has come back to softening position, closing the interlock switch. In Fig. 9, the meter switch 121 of the left hand softener is shown in closed position, but regeneration cannot start because the solenoid circuit is broken at contact segments 160 of the right hand unit (shown in backwashing position). As soon as the right hand unit will have completed its regenerating cycle it will permit the left hand unit to start its cycle.

This interlocking system, in a modified form, can be used to interlock more than two softeners. In this case when one softener goes into regeneration it interrupts the control circuits for all the other softeners; that is, only one softener in a battery can regenerate at one time. This arrangement is convenient in some installations, though for controlling more than two softeners I generally use modified forms of interlocking controls.

Fig. 10 shows a modified interlocking system for two or more units, this system being readily applicable to any number of softener units. In this embodiment, unit A is similar to the basic unit shown in Fig. 8, except that the control circuit 132 is shown as being taken off two wires of the three wire A. C. power circuit 100. The control circuit may, of course, be separate from the power circuit. The second unit B is similar to the basic unit, except that the meter switch and resetting motor, and their corresponding electrical connections, are omitted; since in this embodiment, the controls for the first unit, A, are adapted to control the initiation of regeneration in the other units.

As shown, an interlocking relay is provided between units A and B, this relay comprising a switch 170 operable by a solenoid 171. The solenoid is connected to the circuit breaker 32 of unit A, through wires 172 and 151, and contact segment 131; and to the power line through wire 173. The solenoid is thus adapted to be energized when brush 122 rests upon the contact member 131. This position occurs during the rinsing stage. The relay switch is connected to contact segment 126 of the circuit breaker 32 of unit B through wire 174; and to the power line through wires 175 and 134 and solenoid 102 of unit B. Thus the solenoid 102 of the magnetic switch in unit B can only be energized to start the valve motor when the relay switch is closed. In Figs. 9 and 10 is shown a modified type of float switch 37a in operative connection with a brine measuring tank 2.

In operation, unit A is in the softening phase until the determined amount of water has been softened, whereupon the water meter actuates the meter switch, and initiates the regenerating cycle of unit A. When unit A reaches the rinsing phase, brush 122 makes contact with contact segment 131, and this closes the circuit through the solenoid 171 of the relay switch between units A and B. The relay switch closes the control circuit in unit B through segment 126 of the circuit breaker and the solenoid 102 of the magnetic switch, thereby initiating the regenerating cycle in the unit B. This circuit is mained until the valve in unit B has been turned to the backwashing position and regeneration proceeds as described for the single unit of Fig. 8. The relay switch opens when the brush 122 in unit A moves off contact member 131 and on to segment 126, bringing unit A back to the softening phase, where it remains until the meter again initiates regeneration.

It will be seen that a slight overlapping of regenerating cycles is provided between the two units. If desired, unit B can be made to begin the regenerating cycle when unit A is in some other phase than rinsing. For instance, if wire 172 of the relay switch solenoid is connected to wire 149, instead of wire 151, the relay switch will be energized, and the regenerating cycle in unit B initiated, when unit A is in the brining position.

Any number of units similar to unit B can be connected into the system. Connections 174 and 175 for a third unit are shown in Fig. 10 with the relay solenoid in circuit with the rinsing segment 131 of the circuit breaker of unit B. Progressive regeneration of two or more units in spaced sequence, with a slight overlapping of regenerating cycles, is provided.

Flow rate controllers 176 are shown for both units of Fig. 10 connected in series with the water meter. This is sometimes desirable in order to maintain a constant flow and to distribute the flow of water evenly through all units of the battery. If desired, however, both the flow controller and the meter can be omitted from the secondary units, and the flow controller can be omitted from the primary unit A, if desired.

Fig. 11 shows a modified interlocking control system for two or more softener units, three such units, L, M, and N, being shown. In this system the regenerating cycles of the three units are initiated in timed sequence by a central timing control. The system is shown as applied to two units similar to the basic unit shown in Fig. 8 with one unit of a modified type similar to unit B in Fig. 10. In an actual installation this control system is generally used with three units of the type of units L and M. It can be used with three units of the type N; but for the sake of brevity units of the two types have been shown in one control system.

As shown in Fig. 11, the central timing control comprises a main timing motor 180, advantageously of the synchronous type and connected through leads 181 to two of the three lines of the 3-phase A. C. supply. A switch 182 controls this circuit. As with the individual timing motors in the softener units, the current supply may be separate from the current supply for the valve motors. The timing control further comprises a cam shaft 183 on which are fixed three contact-making cams 184, 185 and 186, and a ratchet gear 187. The cam shaft is driven by the timing motor through a high-ratio speed reducer and a cranking device comprising a revolving bracket 188 provided with an adjustable threaded sliding block 190 shiftable in the bracket by a screw 191 and with a pair of crank arms 192 and 193 each having a pawl 194 engaging the ratchet wheel 187. With this arrangement the timing motor causes the cam shaft to rotate in small angular steps at a slow rate. The effective "throw" of the crank device, and thus the speed of rotation of the cam shaft 183, are adjustable by varying the position of the sliding block 190.

Corresponding to the cams 184, 185 and 186 are cam switches 195, 196 and 197, normally held open by spring means (not shown) and adapted to be closed by the cams in certain angular positions. Cam switch 195 is connected through wires 198 and 199 into the wire 133 of unit L and through wire 200 into wire 134 in unit L. Thus switch 195 controls unit L; when the meter switch 121 of unit L closes, the circuit through the starting solenoid 102 remains open, and regeneration is not to be initiated until cam switch 195 is closed by cam 184, completing the circuit through solenoid 102 through lines 133 and 134. When switch 195 is closed, regeneration is initiated in unit L.

The connections for unit M are entirely similar.

As shown, in units L and M means are provided for shutting off the soft water outlet from the softener at the end of the softening run, these means comprising a diaphragm valve 201 in the soft water outlet from the water meter, this valve being of the type adapted to close upon admission of pressure to the diaphragm. The diaphragm valve is adapted to be put into connection with a constant source of pressure (not shown) through a pilot line 202. A solenoid operated valve 203 adapted to open upon energization of the solenoid is interposed in line 202 as shown. The solenoid is connected into control wire 133 of unit L as shown and is energized when meter switch 121 is closed. An exhaust or pressure relieving outlet 204 having a small orifice 205 is provided for the diaphragm valve 201, to allow this valve to open when the solenoid valve 203 is closed.

Considering now the operation of the control system as applied to units L and M, unit L remains in the softening phase until the meter switch cam 110 allows meter switch 121 to close, this operation taking place when the predetermined quantity of water has been softened. Upon closing of the meter switch, solenoid valve 203 is opened, the solenoid being connected into line 133 as described. Pressure is admitted to diaphragm valve 201, shutting off the soft water outlet of the softener. Regeneration is not initiated immediately, however, because contact switch 195 in the central control remains open. Unit L therefore temporarily remains idle. Switch 182 remains closed while the battery of softeners is in operation and the motor 180 runs continuously. When cam 184 closes contact switch 195, the circuit through lines 133 and 134 in unit L is completed, and this unit begins the regenerating cycle, which proceeds as described in connection with the basic unit shown in Fig. 8. While regeneration is being carried on in unit L, unit M is still in the softening phase.

The central timing control is advantageously so adjusted that each unit would pass somewhat more water than it should—that is, would overrun—were it not for the water meter control which shuts off the soft water line after a predetermined amount of water has been softened. Therefore unit M will have reached the end of its softening phase, and will be standing idle, by the time cam 185 closes contact switch 196. When switch 196 is closed by the central control cam 185, unit M starts in its regenerating cycle.

Any desired number of units can be controlled by the system described, by providing a corresponding number of cams on shaft 183 and a corresponding number of contact switches. Ordinarily the cams are disposed in equal angular positions through 360 degrees, thereby providing equal time intervals between the several regenerations of all units of the battery.

Fig. 11 shows as a third unit a modified basic unit N which is equally adaptable to central timing control. In unit N the meter and the meter switch are omitted, and also the diaphragm valve means for shutting off the soft water outlet. In this unit regeneration is initiated directly by the central timing control, the cam operated contact switch 197 being connected directly through a wire 210 to wire 133 and circuit breaker segment 126 of unit N, and by wire 211 to the connecting wire 134 of solenoid 102 which controls the valve motor of unit N. A rate of flow controller 176 maintains a constant flow rate of softened water. In this arrangement initiation of regeneration is controlled solely by the timing motor 180 through cam shaft 183. This combination control of the rate of flow and of the intervals of time between regenerations assures that a predetermined quantity of water is softened between regenerations. Any desired number of units of this type can be controlled through the central timing control, by providing a like number of cams and cam contact switches. After the initiation of the regeneration cycle in each unit, timing of the several phases such as backwashing, brining and rinsing is controlled, as in all modifications of the basic unit, by the circuit breaker, timing motor and float switch.

The system shown in Fig. 11, comprising softener units of the types L and M in conjunction with a softener unit of the type N, is useful in some installations. In others, it is convenient to have all the softener units of the same type.

The central timing control switch 182 is shown as a hand-operated switch. Sometimes it is desirable and convenient to provide in the place of the hand-operated switch, or in addition thereto, a remotely operated or automatically actuated switch. For instance in municipal softeners where a large storage tank for softened water is provided, there may be provided a float switch which closes when the softened water drops to a predetermined low level; and which opens when a predetermined high level is reached. Such an arrangement is shown in Fig. 11. A float switch 220 is provided in the soft water storage tank, the switch having contact members 221 and 222 adapted to close a circuit through contact points 223 and 224, and contact points 225 and 226 respectively. The float switch is connected in parallel with the manual switch 182, as shown, through wires 227, 228, 229 and 230. The float switch, upon fall of the level of soft water to a predetermined point, is adapted to be closed and thus to complete a circuit from the power line 100 to motor 180. The timing control may be started independently of the float switch control, if desired, by means of the manual switch 182.

Large size softening plants are often supplied by a pump, drawing hard water from a well or the like. In this case it is sometimes advantageous to control the operation of the supply pump or pumps coincidently with the softeners. In Fig. 11 I have shown an arrangement whereby when the softeners are started or stopped, the supply pump is started or stopped. As shown, a supply pump 231 operable by a motor 232 is provided, adapted to draw hard water through inlet 233 from a source not shown and to deliver water through outlet 234 to the softeners, through connections not shown. The motor is connected to the power line 100 (or to any other source of power) through a magnetic switch 235 normally open and closable by a solenoid 236. The solenoid is connected in parallel with power line 181 for the timing motor 180, through wires 237 and 238 as shown. With this arrangement when the predetermined low level is reached in the soft water storage tank, float switch 220 closes, starting the timing motor 181 and hence putting the battery of softeners and the regeneration control into operation. Solenoid switch 235 closes, starting the supply pump 231. Hard water is supplied to the softeners and softened water is delivered by the softeners until the predetermined high level in the soft water storage tank has been reached, whereupon the float switch 220 opens and the entire plant is shut down.

The central timing control may take a different form from that shown; for example, the timing motor may be geared directly to the cam shaft, the adjustable crank being omitted; and the cams may be replaced by a circuit breaker device similar to those shown in connection with the softener units, but with a different arrangement of arcuate segment contacts.

The interlocking and timing control may be used to good advantage for automatically controlling the periodic reconditioning of a battery of filters or similar water treating apparatus.

What I claim is:—

1. A battery of water softening units each comprising in combination a container for zeolites, a multiport valve adapted to make connections for flows of water and brine to and from the container for the several phases of a regenerating cycle in different positions of the valve, an electric motor adapted to move the valve to its different positions in the regenerating cycle, switching means for the motor adapted to control the duration of the different phases in the cycle, and interlocking means for the several motor switches adapted to be actuated by the switching means of one unit at a predetermined stage in the regenerating cycle of the unit and adapted to start the motor for regeneration in another unit when the first unit has passed through a portion of its cycle.

2. A battery of softener units each comprising in combination a container for zeolites, a multiport valve adapted to make connections for flows of water and brine to and from the container for the several phases of a regenerating cycle in different positions of the valve, an electric motor adapted to move the valve to its different positions in the regenerating cycle, a water meter in one of the water connections to the softener, a switch operated by a meter to start the motor for the regenerating cycle, switching means for the motor adapted to regulate the duration of the different phases in the cycle and interlocking control means for the several switching means adapted to allow regeneration in the next unit to start when the first unit has passed through a portion of its cycle, said means comprising a switch in one unit normally open and closable when said unit is in a predetermined phase of the cycle, the switch being connected with the meter switch circuit of another unit, so that the switch means of the first unit is adapted to control the closing of the switch means of said other unit to start its regenerating cycle.

3. A battery of softener units each comprising in combination a container for zeolites, a multiport valve adapted to make connections for flows of water and brine to and from the container for the several phases of a regenerating cycle in different positions of the valve, an electric motor adapted to move the valve to its different positions in the regenerating cycle and control means for regulating the length of the different phases in the cycle, one of said units comprising in addition a water meter, a meter switch actuated by the meter and adapted to start the motor to initiate regeneration in the softener, and interlocking control means for the units comprising a current actuated relay switch in each unit connected into a control circuit of the unit and adapted to be energized and closed by the unit at a predetermined phase of the regenerating cycle in the unit, the relay switch contacts being connected into the meter switch line of the next unit, so that the first of said units serves to initiate regeneration in the next unit when a predetermined phase of regeneration has been reached in the first unit, and likewise the second unit is adapted to initiate regeneration in the succeeding unit at a predetermined phase of the regenerating cycle, and so on.

4. A water softener having a container for zeolites, a source of brine, means including a multiport valve for controlling a cycle of successive phases of softening, washing, and brining, an injector communicating with said container and adapted to draw brine from said source through a conduit, a pressure-operated valve in said conduit adapted to be opened on admission of pressure and conduit means connecting the pressure-operated valve to the multiport valve, the multiport valve being adapted to supply water connection to the brine injector and water pressure to the pressure-operated valve in the brine conduit whereby the multiport valve in one position thereof is adapted to control injection of a flow of brine and water into the softener.

5. A water softener which comprises a container for zeolites, a source of brine, a multiport valve adapted to control a cycle of successive phases of softening, backwashing, brining and rinsing in said container, said valve having two connections to waste, and flow controllers in the waste connections, one waste connection and flow controller being adapted to control the rate of flow of backwashing water and the other adapted to control the rate of flow of rinsing water.

6. A water softener which comprises a container for zeolites, a source of brine, an injector communicating with said container and adapted to draw brine from said source through a conduit, a multiport valve adapted to control a cycle of successive phases of softening, backwashing, brining and rinsing in said container, said valve having two connections to waste, and flow controllers in the waste connections, one waste connection and flow controller being adapted to control the rate of flow of backwashing water and the other adapted to control the rate of flow of rinsing water, said valve being adapted in bringing position to direct the flow from the container into both waste connections.

7. A battery of water softening units having a central interlocked timing control adapted to initiate regenerating cycles in the several units in spaced sequence, each softener unit comprising a container for zeolites, a multiport valve adapted to make connections for flows of water and of brine to and from the container for the several phases of a regenerating cycle in different positions of the valve, an electric motor adapted to turn the valve to its different positions and switching means for the motor adapted to regulate the durations of the different phases in the cycle, the central timing control comprising a plurality of contact switches respectively connected into the switching circuit of each softener, said contact switches normally being open, actuating means common to said switches and adapted to temporarily close said switches at successive spaced intervals of time, so that the respective motors are started in one softener after another at said spaced intervals.

8. A battery of softener units having a central timing control adapted to initiate regenerating cycles in the several units in spaced sequence, each softener unit comprising a container for zeolites, valve means adapted to make connections for flows of water and of brine to and from the container for the usual phases of a regenerating cycle in different valve positions, and electrical control means for the valve means adapted to regulate the duration of the different phases in the cycle, the central timing control comprising a plurality of contact switches connected into the control circuit of each softener, said contact switches normally being open, means adapted upon actuation to temporarily close the several contact switches at spaced intervals of time and power means for actuating said switch-closing means, whereby the central timing control is adapted to initiate regeneration directly in each softener unit at spaced intervals of time.

9. The apparatus of claim 8 wherein a storage reservoir is provided to receive softened water from the softeners, and a float switch is provided in the reservoir and connected in series with the power means for the timing control so that the float switch, when the level of water in the reservoir drops to a predetermined low level, is adapted to put the timing control into operation.

10. The apparatus of claim 8 wherein a supply pump driven by a motor is provided for supplying hard water to the softeners, a switch is provided adapted to control the motor, and means are provided so that the timing control upon going into operation is adapted to actuate the motor control switch.

11. Automatic regenerative base exchange water softening apparatus comprising valve means adapted to make connections for the several flows of water and of brine in a regenerating cycle, a rotary electric motor for operating the valve means, a power circuit for energizing the motor, a spring-electromagnetic switch for controlling the power circuit, a separate control circuit for energizing said power switch to close the power circuit, a motor operated timing switch in said separate control circuit, a brine measuring tank provided with a float switch in circuit with said timing switch motor and a rotary circuit breaking switch in circuit with said timing switch and adapted to be operated by the valve operating motor under control of the timing switch and said float switch to close and open the power switch control circuit at predetermined time intervals and thus to determine the duration of the several flows in the regenerating cycle.

12. A battery of water treating units, each unit having a container for water treating material and conduits for passing flows of water to be treated and of reconditioning fluid through the container, valve means in said conduits adapted to control said flows, power means adapted to actuate the valve means to make connections for a cycle of reconditioning operations and return to water treating, a power supply for each power means and means for initiating operation of the power means of each unit independently of the other units, each unit having means operated by its power means during reconditioning operatively connected with the means for initiating operation of the power means of other units and interrupting the power supply to the power means except at one definite setting of the power means, so as to prevent operation of the power means of other units of the battery during reconditioning of the said unit.

13. A battery of water treating units, each unit having a container for water treating material and conduit connections for passing flows of water to be treated and of reconditioning fluid through the container, valve means in said conduits adapted to control said flows, power means adapted to actuate the valve means to make connections for a cycle of reconditioning operations and return to water treating, and means for initiating operation of the power means of each unit independently of the other units, each unit being provided with means adapted to be actuated during reconditioning and to prevent operation of the power means of other units in the battery during reconditioning of one unit.

14. A battery of water treating units having in each unit a multiway valve adapted on operation to make connections for a plurality of serial water treating stages and a valve operating motor in each unit, a common power circuit having branches leading to each of the valve operating motors, an electrically operable switch in each of said branches for stopping and starting the valve operating motor in each unit, a circuit making and breaking switch in each unit driven by the valve operating motor, a second switch in each unit, a rotary electric timing motor for operating said second switch, a control power circuit common to all units and distinct from the valve operating motor power circuit and including said timing motors, said second switches, said circuit breakers and said electrically operable switches in the several units so connected that the circuit breaker and the second switch of each unit cooperate to start and stop the valve operating motor in each unit at predetermined intervals corresponding to the several water treating stages, normally open switch contact means in the control circuit in each unit, and interlocking switch control means operating to close said switch contact means and adapted to start the valve operating motor of one unit at a predetermined interval after the start of the valve operating motor of another unit and thus to additionally control said plurality of operating stages in each unit.

15. The apparatus of claim 7 in which the central timing control comprises a plurality of rotating members and a plurality of fixed contact elements respectively connected into the switching circuit of each softener unit, the rotating members cooperating in certain positions with the fixed elements, the rotating members normally being off the fixed elements, and the rotary members are rotated continuously during the operation of the softening battery.

16. Automatic regenerative base exchange water softening apparatus comprising valve means adapted to make connections for the several flows of water and of brine in a regenerating cycle, a rotary electric motor for operating the valve means, a power circuit for energizing the motor, an electrically operated switch for controlling the power circuit, a separate control circuit for energizing said power switch to close the power circuit, a water meter in communication with the valve, switch means included in said separate control circuit and operated by the water meter, so that the water meter initially closes the power circuit, a motor operated timing switch in said separate control circuit, a brine measuring tank provided with a float switch in circuit with said timing switch motor and a rotary circuit breaking switch in circuit with said timing switch and adapted to be operated by the valve operating motor under control of the timing switch and said float switch to close and open the valve motor switch control circuit at predetermined time intervals and thus to determine the duration of the several flows in the regenerating cycle.

EUGENE STAEGEMANN.